(12) United States Patent
Shimizu et al.

(10) Patent No.: US 6,991,217 B2
(45) Date of Patent: Jan. 31, 2006

(54) VIBRATION TYPE LINEAR ACTUATOR

(75) Inventors: Hiroaki Shimizu, Hikone (JP);
Hidekazu Yabuuchi, Hikone (JP);
Masashi Moriguchi, Inugami-gun (JP);
Noboru Kobayashi, Hikone (JP); Ryo Motohashi, Hikone (JP); Ryuji Otani, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/508,707

(22) PCT Filed: Jun. 17, 2003

(86) PCT No.: PCT/JP03/07696

§ 371 (c)(1),
(2), (4) Date: Sep. 30, 2004

(87) PCT Pub. No.: WO03/107516

PCT Pub. Date: Dec. 24, 2003

(65) Prior Publication Data

US 2005/0173662 A1    Aug. 11, 2005

(30) Foreign Application Priority Data

Jun. 17, 2002  (JP) ............................... 2002-176466

(51) Int. Cl.
*F16K 51/00*     (2006.01)

(52) U.S. Cl. ............................ 251/284; 310/12; 30/43

(58) Field of Classification Search ................ 251/284,
251/129.01; 310/12, 15, 36; 30/43, 43.92
See application file for complete search history.

(56) References Cited

U.S. PATENT DOCUMENTS

| | | | | |
|---|---|---|---|---|
| 3,906,263 A | * | 9/1975 | Chen et al. ................. 310/29 |
| 4,326,138 A | * | 4/1982 | Shtrikman ................... 310/36 |
| 4,583,027 A | * | 4/1986 | Parker et al. ................. 310/15 |
| 5,632,087 A | * | 5/1997 | Motohashi et al. ......... 30/43.92 |
| 5,736,797 A | * | 4/1998 | Motohashi et al. ........... 310/36 |
| 5,886,601 A | | 3/1999 | Kitamura et al. |
| 5,921,134 A | | 7/1999 | Shiba et al. |
| 6,441,517 B1 | * | 8/2002 | Brum et al. .................. 310/30 |
| 6,559,563 B1 | * | 5/2003 | Shimizu et al. ............... 310/12 |

FOREIGN PATENT DOCUMENTS

EP      1162721      12/2001

(Continued)

OTHER PUBLICATIONS

English Language Abstract of JP 11-285226.
English Language Abstract of JP 8-318061.
English Language Abstract of JP 11-136921.

*Primary Examiner*—John Bastianelli
(74) *Attorney, Agent, or Firm*—Greenblum & Bernstein, P.L.C.

(57) ABSTRACT

In an oscillation type linear actuator for reciprocally moving a plurality of moving members held in parallel with each other in a predetermined direction owing to electromagnetic action between a stator and them, two moving members reciprocally moving in opposite phases with each other are coupled by a coupling member having spring function, and a non-displacing portion of a plate spring portion of the coupling member which is not displaced substantially is restricted by a stopper. Even when an external force is applied to one of two moving members reciprocally moving in the opposite phases each other, motion of the other moving member is transmitted to the moving member via the coupling member, so that reduction of amplitude of the moving member to which the external force is applied can be restricted, and a balance of amplitudes of two moving members is maintained.

13 Claims, 21 Drawing Sheets

FOREIGN PATENT DOCUMENTS

| | | |
|---|---|---|
| JP | 8-318061 | 12/1996 |
| JP | 11-136921 | 5/1999 |
| JP | 11-285226 | 10/1999 |
| WO | 96/37347 | 11/1996 |

\* cited by examiner

F I G. 1
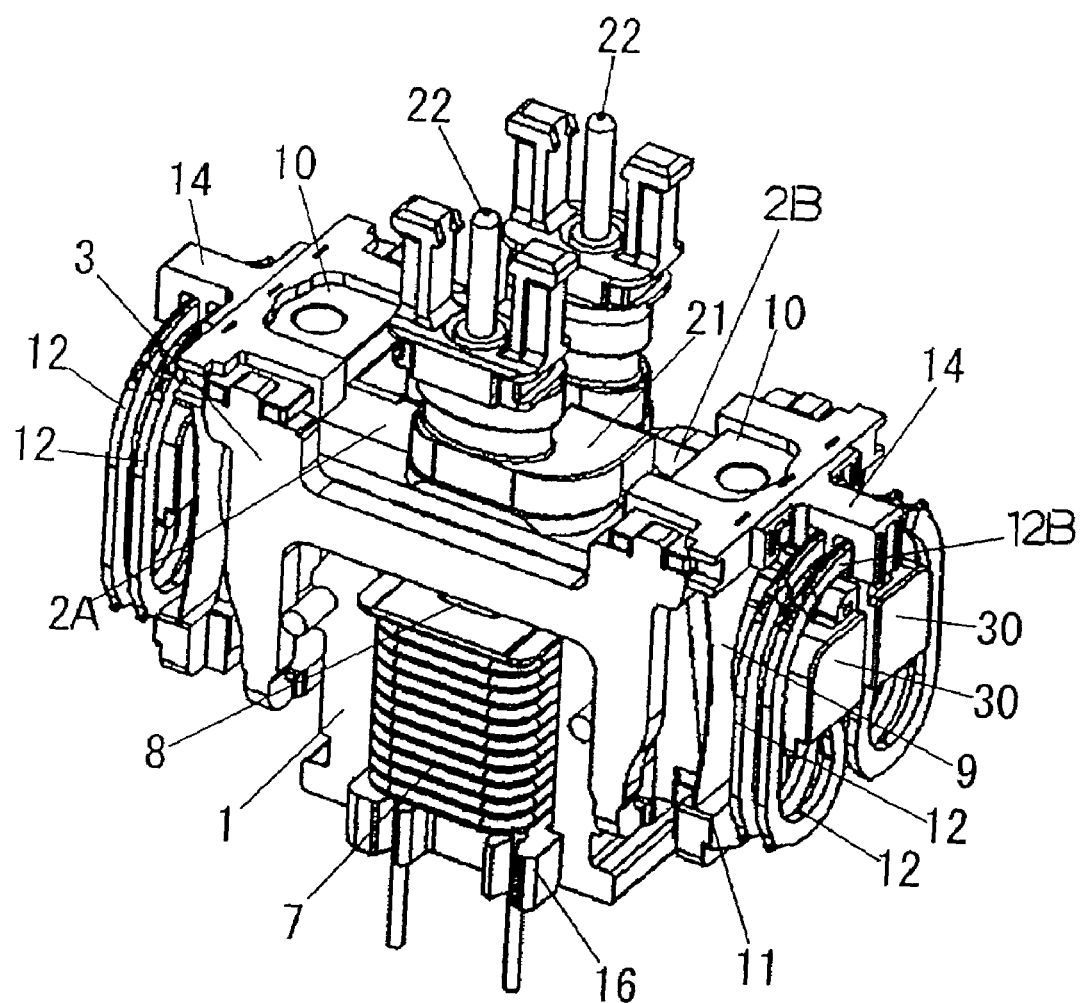

F I G. 6A
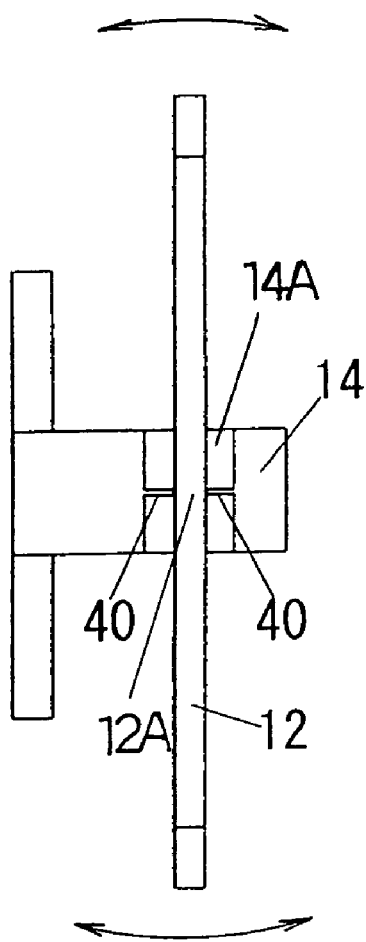
F I G. 6B
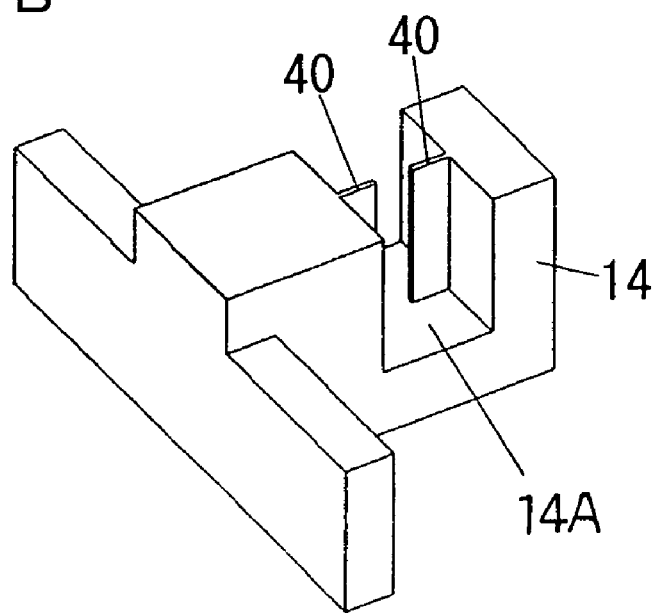

F I G. 1 1 A
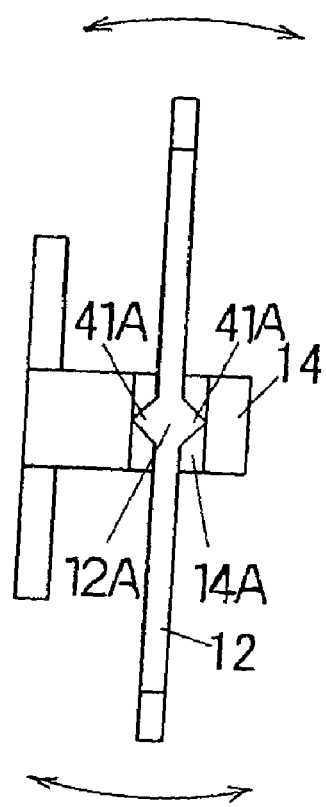
F I G. 1 1 B
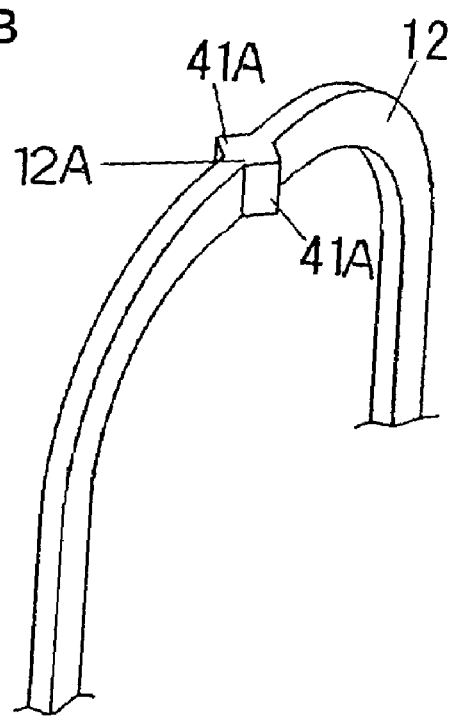

VIBRATION TYPE LINEAR ACTUATOR

TECHNICAL FIELD

The present invention relates to an oscillation type linear actuator used as a driving source of a reciprocation type power shaver, and so on.

BACKGROUND ART

Conventionally, oscillation type linear actuators having various constitutions are proposed as a driving source of a reciprocation type power shaver. In a conventional oscillation type linear actuator shown in Publication Gazette of Japanese Patent Application 8-3180610(first conventional art), two moving members are coupled by a coupling member having a spring function and displacing in a direction of reciprocal movement of the moving members, in order to prevent occurrence of uncomfortable vibration without losing a balance of oscillation of the moving members, even when a force is externally applied to one of the moving members oscillated in opposite phases with each other.

When a large load is applied to only one of the moving members while the moving members are respectively driven reciprocally in opposite phases, an amplitude of the oscillation of the moving member is suddenly made be reduced. The coupling member, however, transmits a motion of the other moving member to the moving member, so that the reduction of the amplitude of the moving member, to which the load is applied, is restricted. Consequently, the balance of the amplitudes of two moving members can be maintained.

In the first conventional art, a coil spring, however, is used as the coupling member having the spring function, so that it needs a space for disposing the coil spring between the moving members. Consequently, it has a problem that the entire size of the actuator becomes larger.

On the other hand, in another conventional oscillation type linear actuator shown in Publication Gazette of Japanese Patent Application 11-136921 (second conventional art), a plate spring is used as a coupling member with the aim of downsizing. An upper end portion of the coupling member is fixed on a chassis by a screw, and a lower end portions are respectively fixed on two moving members so that two moving members are coupled.

In this case, even though a space for disposing the coupling member can be made smaller in comparison with the case that the coil spring is used as the coupling member, it, however, has a problem that the function as the coupling member is deteriorated in comparison with one using the coil spring, since the upper end portion of the coupling member is kept under restraint on the chassis by the screw, and a motion of a moving member cannot be transmitted sufficiently to the other when a large load is applied to the other moving member.

DISCLOSURE OF INVENTION

The present invention is carried out for solving the above-mentioned problems of the conventional arts and aims to provide an oscillation type linear actuator, which is compact and drivable stably.

For accomplishing the above-mentioned purpose, an oscillation type linear actuator in accordance with an aspect of the present invention comprises: a plurality of moving members which are held in parallel with each other and reciprocally movable in a predetermined direction; a stator for reciprocally moving the moving members respectively in the predetermined direction owing to electromagnetic action between the moving members and it; at least one coupling member coupling two moving members which are reciprocally moved in opposite phases with each other, and having a plate spring portion deformable corresponding to the reciprocal movement of the moving members; and a stopper contacting with a non-displacing portion of the plate spring portion of the at least one coupling member which is not substantially displaced when the moving members are reciprocally moved in the opposite phase with each other, and for restricting a movement of the non-displaced portion in a direction of the reciprocal movement of the moving members.

By such a configuration, when a force is externally applied to one of two moving members oscillated in opposite phases with each other, the motion of the other moving member is transmitted to the moving member via the coupling member, so that reduction of amplitude of the moving member to which the load is applied is restricted, and the balance of the amplitudes of two moving members can be maintained. Even though the coupling member having the plate spring portion is used similarly to the second conventional art, the coupling member, however, contacts with the stopper only at the non-displacing portion which is not substantially displaced when the moving members are reciprocally moved in the opposite phase with each other, so that a rotation motion of the coupling member around the non-displacing portion is not substantially restricted. Thus, the motion can be transmitted between the moving members, effectively. Consequently, it is possible to prevent the occurrence of uncomfortable vibration without unbalancing the oscillation of the moving members, similarly to the first conventional art. Furthermore, the downsizing of the oscillation type linear actuator can be realized, similarly to the second conventional art.

BRIEF DESCRIPTION OF DRAWINGS

FIG. 1 is a perspective view showing a constitution of an oscillation type linear actuator in accordance with an embodiment of the present invention.

FIG. 6A is a bottom view showing a first modification of an engaging structure of a stopper and the coupling member in the above-mentioned oscillation type linear actuator.

FIG. 6B is a perspective view showing a shape of the stopper in the first embodiment.

FIG. 11A is a bottom view showing a sixth modification of the engaging structure of the stopper and the coupling member in the above-mentioned oscillation type linear actuator.

FIG. 11B is a perspective view showing a shape of the coupling member in the sixth embodiment.

BEST MODE FOR CARRYING OUT THE INVENTION

Figure 2:
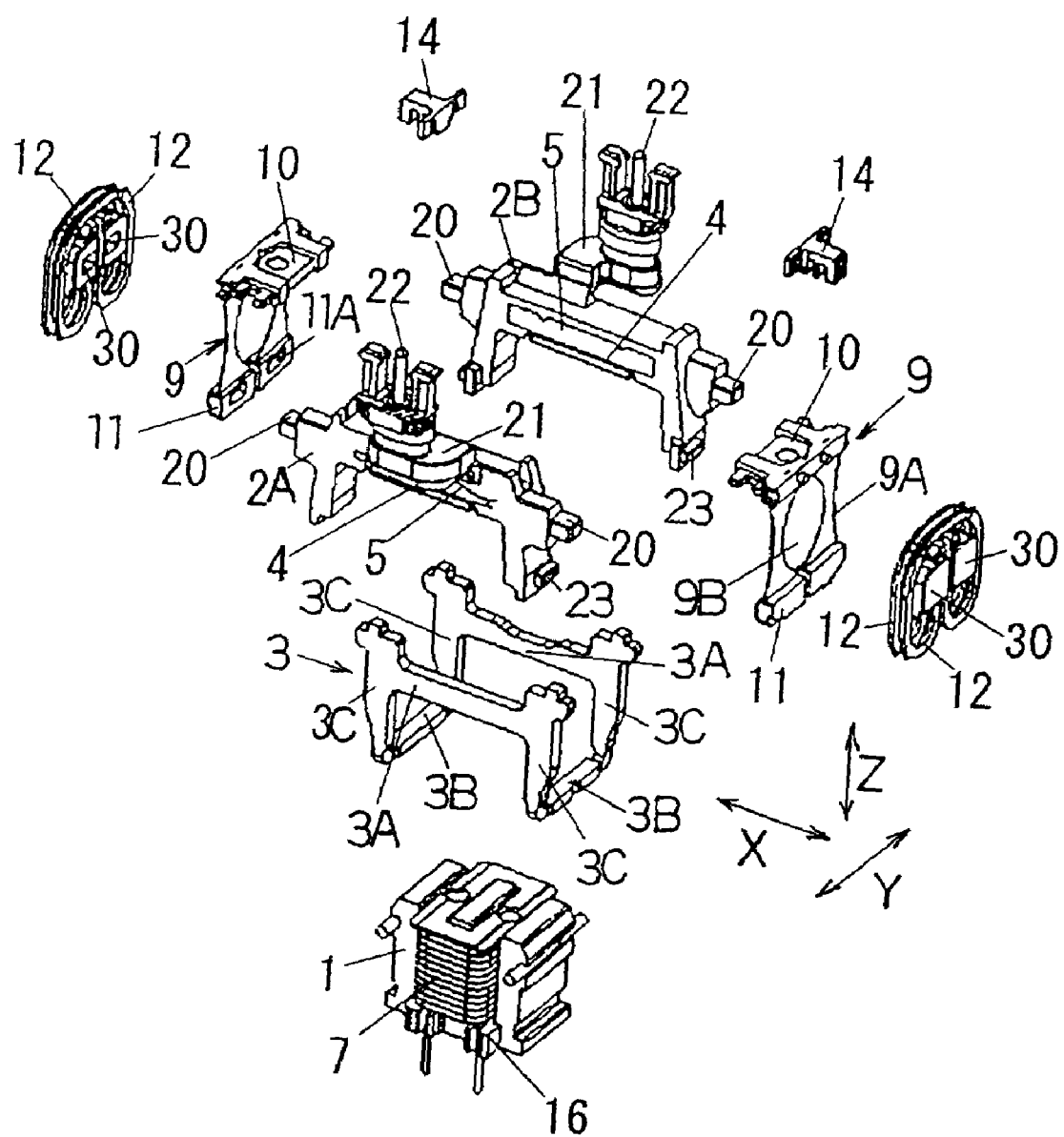
FIG. 2 is an exploded perspective view showing the constitution of the above-mentioned oscillation type linear actuator.
Figure 3:
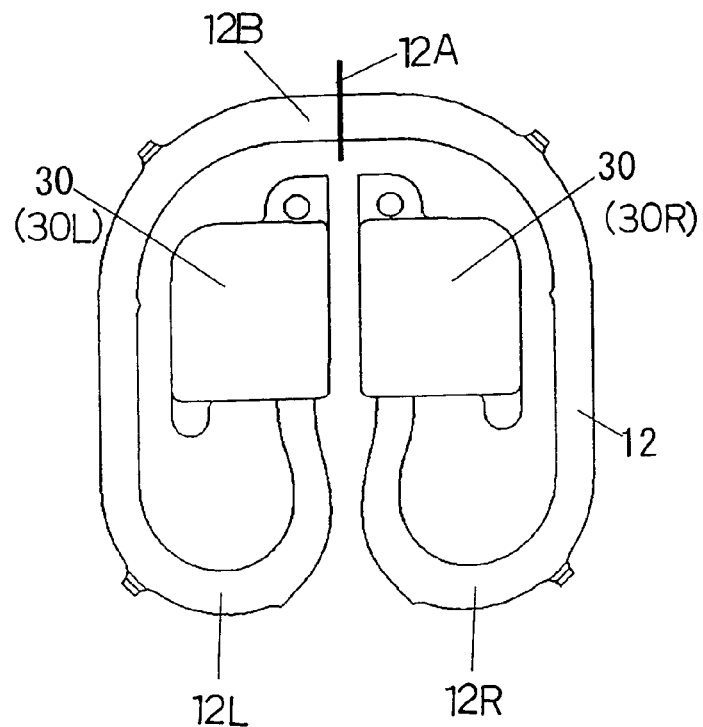
FIG. 3 is a front view showing a shape of a coupling member in the above-mentioned oscillation type linear actuator.
Figure 4:
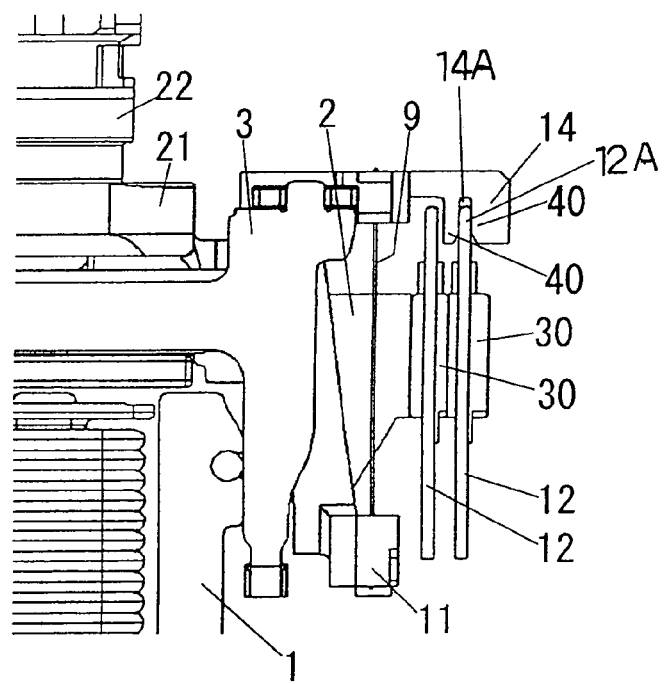
FIG. 4 is a side view of a main section of the above-mentioned oscillation type linear actuator.
Figure 5:
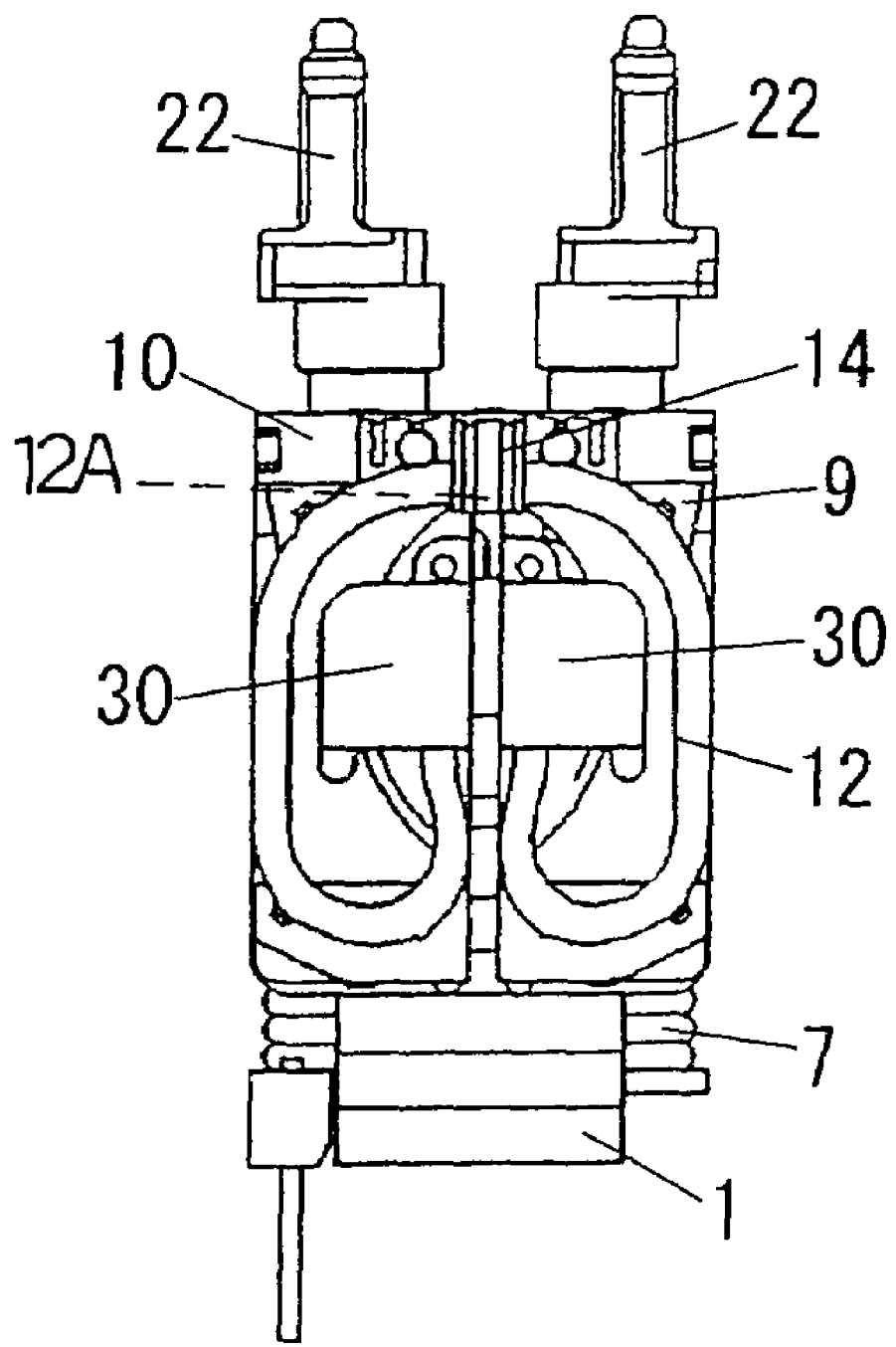
FIG. 5 is a front view of the above-mentioned oscillation type linear actuator.

A first embodiment of the present invention is described with reference to FIGS. 1 to 5. FIG. 1 is a perspective view showing a constitution of an oscillation type linear actuator in accordance with the first embodiment, and FIG. 2 is an exploded perspective view thereof. FIG. 3 is a front view showing a configuration of a coupling member 12, which will be described below. FIG. 4 is aside view showing a constitution of a main section around the coupling member 12, and FIG. 5 is a front view thereof.

The oscillation type linear actuator is formed for a driving source of a reciprocation type power shaver, and comprises a stator 1, a pair of moving members 2A and 2B, a chassis 3, a pair of suspenders 9 for suspending the moving members 2A and 2B from the chassis 3, four coupling members 12 for coupling two moving members 2A and 2B, and so on.

The stator 1 is an electromagnet in which a coil 7 is wound around a laminated body of iron plate of magnetic material or a sintered component of a magnetic material via a bobbin 6 made of resin, and fixed on the chassis 3 by screws, or the like.

Each of the moving members 2A and 2B is formed integrally with a yoke 5 (back yoke) made of magnetic material by insert molding, and a permanent magnet 4 is fixed on each yoke 5 by an adhesive. Furthermore, couplers 22, with which moving razor blades of the power shaver are respectively coupled, are provided on upper faces of arms 21 formed for protruding L-shape sidling of the moving members 2A and 2B.

The chassis 3 holds the moving members 2A and 2B in a manner so that not only they can reciprocally move in X-direction but also the permanent magnets 4 face an upper face of the stator 1 via a predetermined gaps 8. Thus, the chassis 3 is constituted by two beams 3A in X-direction, two beams 3B in Y-direction and four beams 3C in Z-direction.

Each suspensions 9 is constituted by a bridge portion 10 fixed on both end portions of the beams 3A of the chassis 3 in X-direction, plate spring portions 9A and lower end portions 11 which are engaged with first protrusions 23 provided at both lower end portions of the moving members 2A and 2B. Recesses 11A, which are to be engaged with the first protrusions 23 of the moving members 2A and 2B, are provided on the lower end portions 11 of the suspender 9. Furthermore, the bridge portion 10 serves as a fixing portion when the oscillation type linear actuator is assembled on a main body of the power shaver, or the like.

When the first protrusions 23 of the moving members 2A and 2B are engaged with the recesses 11A on the lower end portions 11 of the suspenders 9, and the bridge portions 10 of the suspenders 9 are respectively engaged with both end portions of the chassis 3 in X-direction, the moving members 2A and 2B are suspended in a space formed between the beams 3A of the chassis 3 in X-direction and can be displaced in X-direction owing to warp of the plate spring portions 9A.

The permanent magnet 4 is fixed on one moving member 2A in a manner so that polarity (orientation of N-pole and S-pole) thereof becomes opposite to the polarity of the permanent magnet 4 on the other moving member 2B. Under such a condition, when directions of current applied to the electromagnet of the stator 1 are alternated, absorption and objections owing to magnetic action are repeated between the stator 1 and the permanent magnets 4. At that time, the moving members 2A and 2B repeat the reciprocal movement in opposite phases (oscillation) with each other with warping the plate spring portions 9A, since they are respectively suspended in a manner to be able to displace in X-direction independently by the suspender 9.

When the coil 7 constituting the stator 1 is a winding of a single wire, the direction of the current applied to the coil 7 is alternated at a predetermined term in a manner so that motive forces are acted on the moving directions of the moving members 2A and 2B for reciprocally moving them. Furthermore, since the polarities of the permanent magnets 4 on the moving members 2A and 2B are opposed with each other, the moving members 2A and 2B respectively have phases of oscillation discrepant by 180 degrees with each other, and the vibration in the moving direction (x-direction) is reduced.

Second protrusions 20 are respectively provided on both end portions of the moving members 2A and 2B in X-direction. The second protrusions 20 respectively protrude toward the outside of the suspenders 9 through substantially circular openings 9B formed between the plate spring portions 9A of the suspenders 9. Furthermore, coupling portions 30 of the coupling members 12 are respectively engaged with the second protrusions 20 protruding outsides of the suspenders 9. The coupling members 12 are used for coupling the moving members 2A and 2B with maintaining a state of reciprocally movable in X-direction, independently.

As shown in FIG. 3, the coupling member 12 has first plate spring portions 12L and 12R disposed symmetrical and having substantially smaller U-shape, and a second plate spring portion 12B coupled with outer portions of respective of the first plate portions 12L and 12R and having substantially a larger U-shape. The coupling portions 30L and 30R are respectively formed at inner front ends of the first plate spring portions 12L and 12R. As shown in FIGS. 1, 2 and 4, the moving members 2A and 2B are totally coupled with four coupling members 12 in a manner so that two of them are coupled with the second protrusions 20 at each side.

These coupling members 12 are used for restricting the reduction of the amplitude of the reciprocal movement (oscillation) of one moving member 2A or 2B owing to the movement of the other moving member 2B or 2A, when a load applied to the moving member 2A or 2B is larger and the amplitude thereof is suddenly made be reduced. When the alternating current is applied to the coil 7 of the stator 1, two moving members 2A and 2B repeat the reciprocal movement (oscillation) in opposite phases with each other. The coupling portions 30 of the coupling members 12, however, are respectively engaged with the second protrusions 20 provided on the end portions of the moving members 20A and 20B. Thus, for example, when the coupling portion 30L at left hand shown in FIGS. 3 and 5 displaces perpendicularly upward with respect to the paper sheet, the coupling portion 30R at right hand displaces perpendicularly downward with respect to the paper sheet, and vice versa.

Corresponding to the displacements of the coupling portions 30L and 30R, the first plating portions 12L and 12R, and the second plate spring portion 12B warp in a direction perpendicular to the paper sheet. In this embodiment, since the coupling members 12 are not fixed on the chassis 3, each coupling member 12 can be displaced in an X-Y plane defined by X-direction and Y-direction entirely, corresponding to the reciprocal movement of the moving members 2A and 2B. Especially, attending to the second plate spring portion 12B, it is swung on the X-Y plane around the center portion (non-displacing portion) designated by a symbol 12A in FIG. 3 of the second plate spring portion 12B as an axis. Thus, even when a large load is applied to one of the moving members 2A or 2B, and the amplitude of the reciprocal movement (oscillation) thereof is suddenly made be reduced, the motion of the other moving member 2B or 2A is effectively transmitted to the moving member 2A or 2B by the coupling members 12, so that the reduction of the amplitude of the moving member 2A or 2B can be restricted. Consequently, the reduction of the amplitude of only one moving member 2A or 2B can be prevented, so that evenly balanced amplitudes can be generated always. The coupling members 12 serve as springs for setting natural frequency for making the natural frequency of the moving members 2A and 2B constant.

While two moving members 2A and 2B are reciprocally moved (oscillated) evenly balanced, the center portions 12A of the coupling members 12 are substantially positioned at the same positions as non-displacing portions. When a large load is applied to only one of the moving member 2A or 2B, the reciprocal movements (oscillations) of two moving members 2A and 2B are instantaneously unbalanced, so that there is a possibility that the moving member displaces in X-direction. Thus, as shown in FIGS. 1 and 4, a groove 14a of a stopper 14 fixed on the bridge portion 10 of the above-mentioned suspender 9 is engaged with the non-displacing portion 12A of the coupling member 12 disposed, for example, at the most outward, so that side faces of the non-displacing portion 12A of the coupling member 12 contacts with side faces of the groove 14A of the stopper 14.

In other words, in this embodiment, each coupling member 12 are not essentially restricted, but the non-displacing portion 12A is regionally restricted, so that the non-displacing portion 12A of the coupling member 12 cannot be displaced in the displacing direction (X-direction) of the moving members 2A and 2B, even when the large load is applied to only one moving member 2A or 2B. Thus, it is possible to transmit the motion of the other moving member 2B or 2A to the moving member 2A or 2B effectively.

According to this embodiment, since the coupling members 12 are constituted as plate spring shape, the space necessary for disposing the coupling members 12 can be made smaller, and the oscillation type linear actuator can be downsized. Furthermore, as shown in FIGS. 3 and 5, since each coupling member 12 is constituted by combination of a plurality of substantially U-shaped plate spring portions 12L, 12R and 12B, substantially entire of length of them can serve as plate spring portion. Thus, the length necessary for serving as the plate spring can be fit into a smaller size. Still furthermore, totally four coupling members 12 are used so that two of them are respectively engaged with both end portions of the moving members 2A and 2B, so that stress applied to each coupling member 12 becomes smaller, and the life of the coupling member 12 can be extended.

Subsequently, deformations of the stopper 14 are described. In the example shown in FIG. 4, the groove 14A is provided on the stopper 14, and the non-displacing portion 12A of the coupling member 12 is engaged with the groove 14A of the stopper 14. In a first modification shown in FIGS. 6A and 6B, a rib-shaped protrusion (contacting portion) 40 is formed on each side face of the groove 14A so that the non-displacing portion 12A of the coupling member 12 contacts with the protrusion 40 along a line. According to the first modification, even though the shape of the stopper 14 becomes complex, friction between the coupling member 12 and the stopper 14 is reduced, so that the load resistance can be made smaller.

Figure 7A:
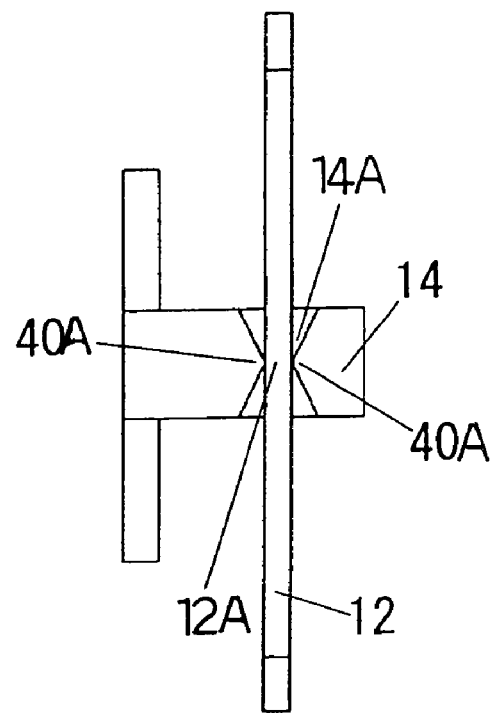
FIG. 7A is a bottom view showing a second modification of the engaging structure of the stopper and the coupling member in the above-mentioned oscillation type linear actuator.
Figure 7B:
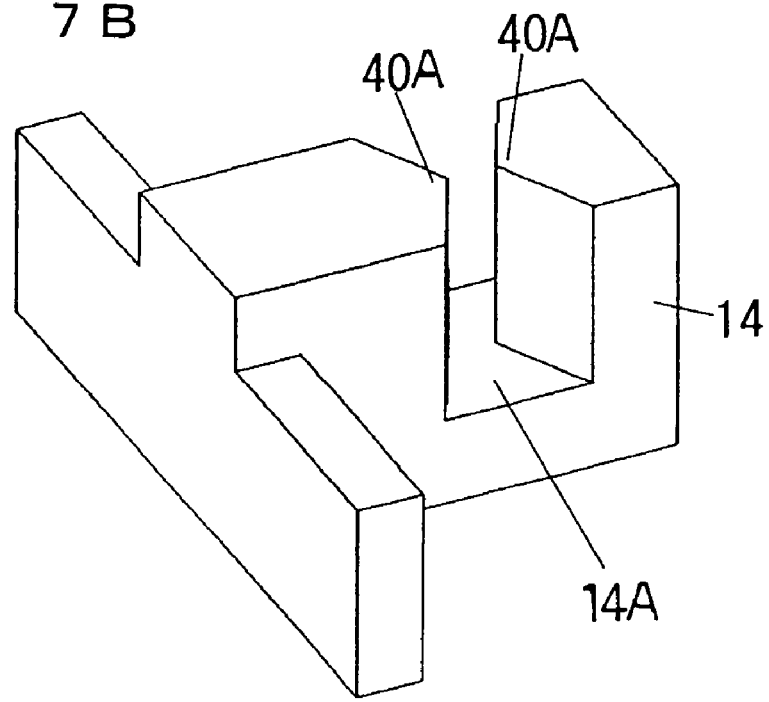
FIG. 7B is a perspective view showing a shape of the stopper in the second embodiment.
Figure 8A:
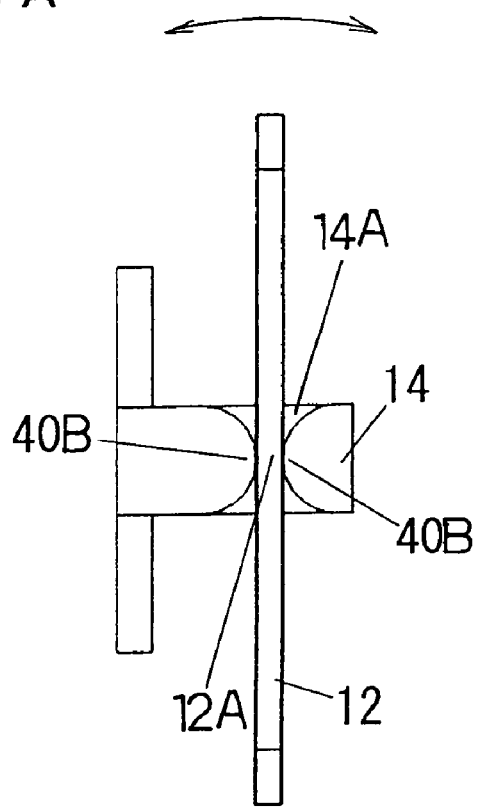
FIG. 8A is a bottom view showing a third modification of the engaging structure of the stopper and the coupling member in the above-mentioned oscillation type linear actuator.
Figure 8B:
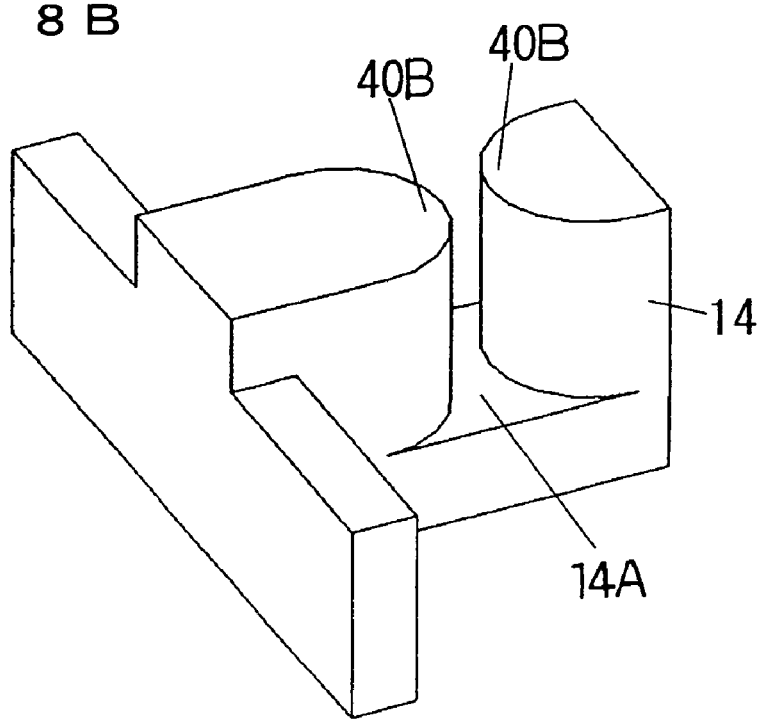
FIG. 8B is a perspective view showing a shape of the stopper in the third embodiment.

In a second modification shown in FIGS. 7A and 7B, each side face of the groove 14A of the stopper 14 has two planes, and the center portion thereof is protruded so as to make the width narrower (protruded portion is designated by a symbol 40A). In a third modification shown in FIGS. 8A and 8B, each side face of the groove 14A of the stopper 14 is cylindrical, and the center portion thereof is protruded so as to make the width narrower (protruded portion is designated by a symbol 40B). According to these second and third modifications, the non-displacing portion 12A of the coupling member 12 contacts with the protrusion 40A or 40B along a line, so that friction between the coupling member 12 and the stopper 14 is reduced, and the load resistance can be made smaller. Furthermore, in comparison with the first modification, rigidity of the stopper 14 can be increased.

Figure 9A:
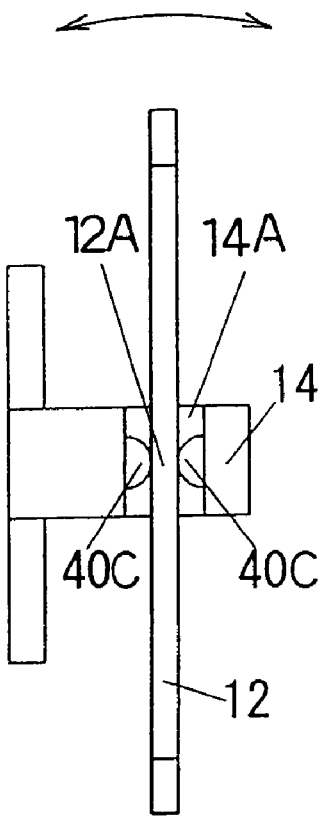
FIG. 9A is a bottom view showing a fourth modification of the engaging structure of the stopper and the coupling member in the above-mentioned oscillation type linear actuator.
Figure 9B:
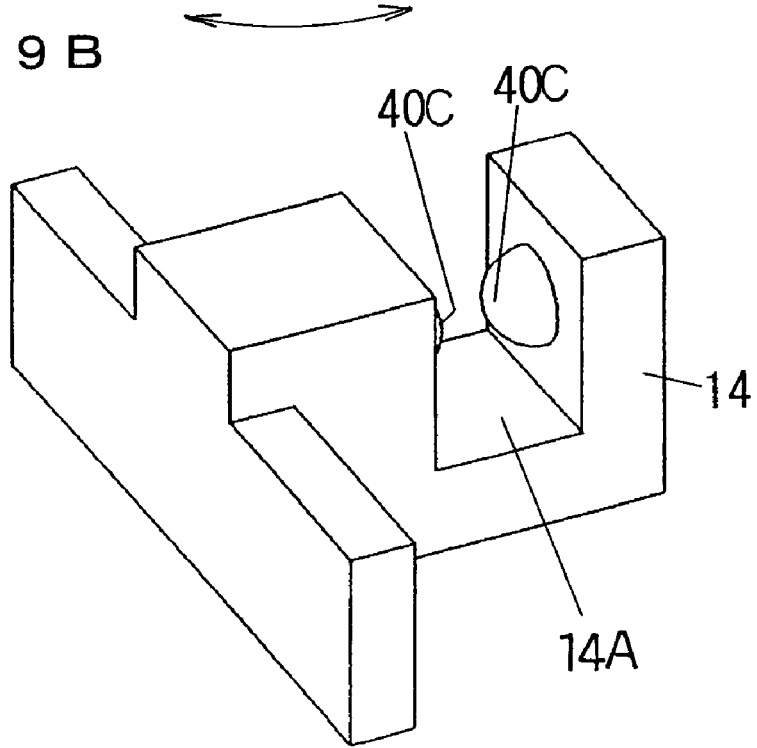
FIG. 9B is a perspective view showing a shape of the stopper in the fourth embodiment.

In a fourth modification shown in FIGS. 9A and 9B, a hemispherical protrusion 40C is formed on each side face of the groove 14A of the stopper 14, so that the non-displacing portion 12A of the coupling member 12 contacts with the protrusion 40C at a point. According to the fourth modification, even though a constitution of a die for molding the stopper 14 becomes complex, a contacting area of the coupling member 12 and the stopper 14 becomes much smaller, so that the friction between them can be reduced much more.

Figure 10A:
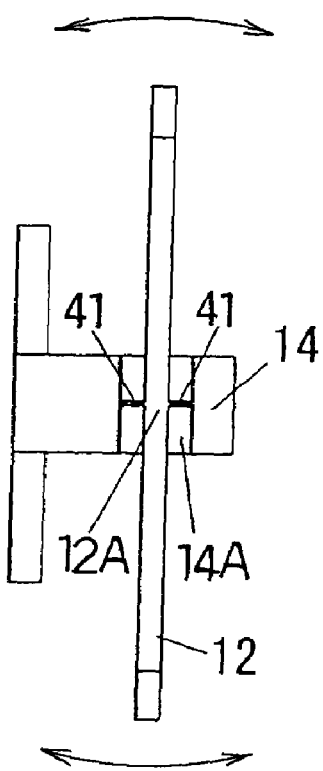
FIG. 10A is a bottom view showing a fifth modification of the engaging structure of the stopper and the coupling member in the above-mentioned oscillation type linear actuator.
Figure 10B:
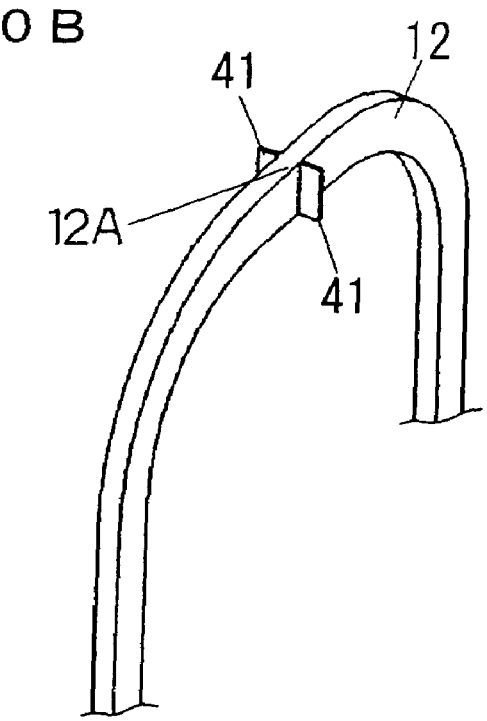
FIG. 10B is a perspective view showing a shape of the coupling member in the fifth embodiment.

In a fifth modification shown in FIGS. 10A and 10B, a rib-shaped protrusion 41 is formed on each side face of the non-displacing portion 12A of the coupling member 12, and the protrusion 41 contacts with each side face of the groove 14A of the stopper 14 along a line, contrary to the above-mentioned first modification. By such a configuration, the same effect as that of the first modification can be obtained.

Figure 12A:
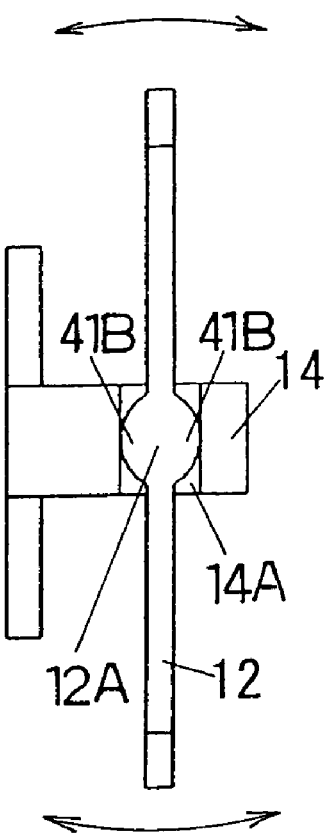
FIG. 12A is a bottom view showing a seventh modification of the engaging structure of the stopper and the coupling member in the above-mentioned oscillation type linear actuator.
Figure 12B:
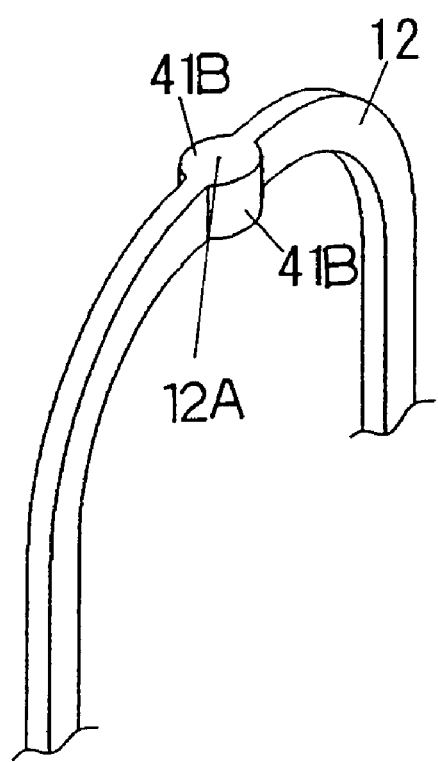
FIG. 12B is a perspective view showing a shape of the coupling member in the seventh embodiment.

A sixth modification shown in FIGS. 11A and 11B corresponds to the above-mentioned second modification. A protrusion 41A having two planes is formed on each side face of the non-displacing portion 12A of the coupling member 12, so that the protrusion 41A contacts with each side face of the groove 14A of the stopper 14 along a line. A seventh modification shown in FIGS. 12A and 12B corresponds to the above-mentioned third modification. A cylindrical protrusion 41B is formed on each side face of the non-displacing portion 12A of the coupling member 12, so that the protrusion 41B contacts with each side face of the groove 14A of the stopper 14 along a line. By such constitutions, the same effects as those of the second and third modifications can be obtained.

Figure 13A:
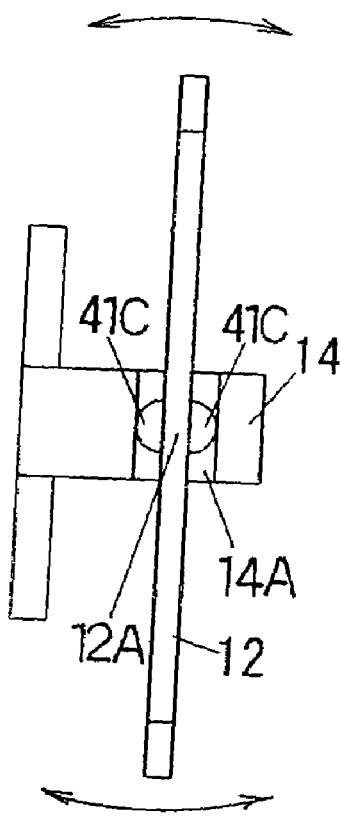
FIG. 13A is a bottom view showing an eighth modification of the engaging structure of the stopper and the coupling member in the above-mentioned oscillation type linear actuator.
Figure 13B:
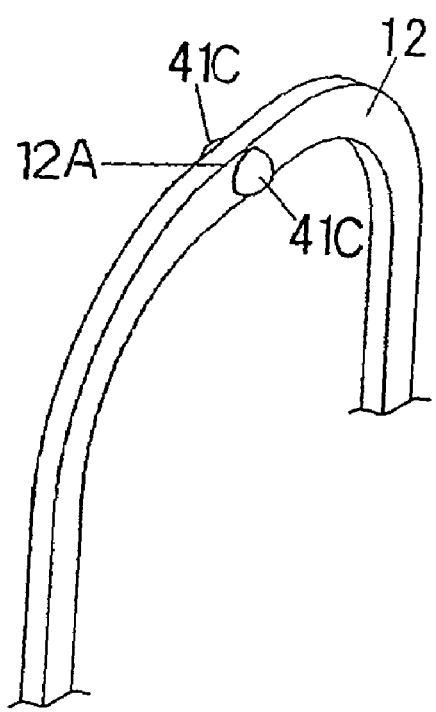
FIG. 13B is a perspective view showing a shape of the coupling member in the eighth embodiment.

An eighth modification shown in FIGS. 13A and 13B corresponds to the above-mentioned fourth modification. A hemispherical protrusion 41C is formed on each side face of the non-displacing portion 12A of the coupling member 12, so that the protrusion 41C contacts with each side face of the groove 14A of the stopper 14 at a point. By such a configuration, the same effect as that of the fourth modification can be obtained.

Figure 14:
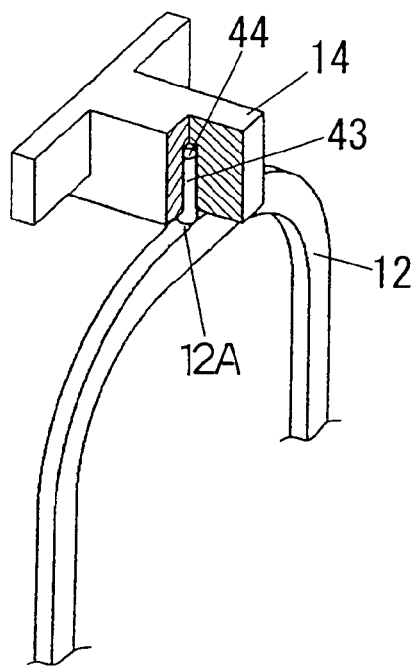
FIG. 14 is a perspective view showing a ninth modification of the engaging structure of the stopper and the coupling member in the above-mentioned oscillation type linear actuator.
Figure 15:
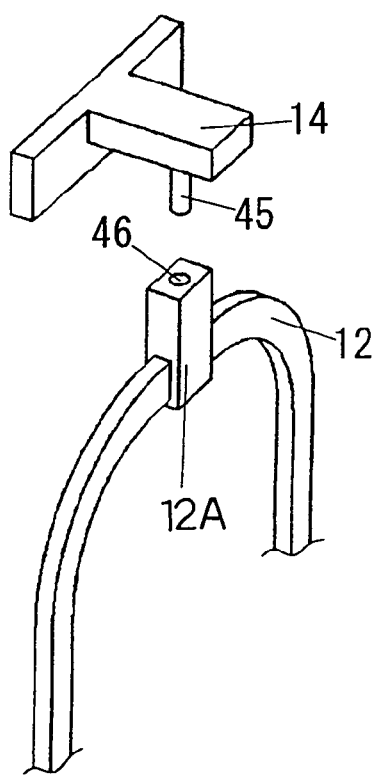
FIG. 15 is a perspective view showing a tenth modification of the engaging structure of the stopper and the coupling member in the above-mentioned oscillation type linear actuator.

In a ninth modification shown in FIG. 14, a rotation shaft 43 is formed on the non-displacing portion 12A of the coupling member 12, and a bearing 44 is formed on the stopper 14, so that the coupling member 12 is rotatably borne by engagement of the rotation shaft 43 with the bearing 44. In a tenth modification shown in FIG. 15, a bearing 46 is formed on the non-displacing portion 12A of the coupling member 12, and a rotation shaft 45 is formed on the stopper 14, so that the coupling member 12 is rotatably borne by engagement of the rotation shaft 45 with the bearing 46. According to these modifications, even though the shapes of the coupling member 12 and the stopper 14 become complex, the motion of the coupling member 12 can be made much smoother. It is possible that the rotation shafts 43 and 45 are respectively formed integrally with the coupling member 12 and the stopper 14 by resin molding. Alternatively, it is possible that the rotation shafts 43 and 45 are respectively formed by metal, and they are fitted to or integrally formed by insert molding with the coupling member 12 or the stopper 14 made of resin.

In the above-mentioned first modification to the fourteenth (SIC) modification, it is illustrated the case that one groove 14 or bearing 44 is formed on one stopper 14 so as to be engaged with one coupling member 12. This invention, however, is not limited these examples. It is possible to form the grooves 14 or the bearings 44 having substantially the same shapes at two positions on the same stopper, so that two coupling members 12 are engaged with them.

Figure 16:
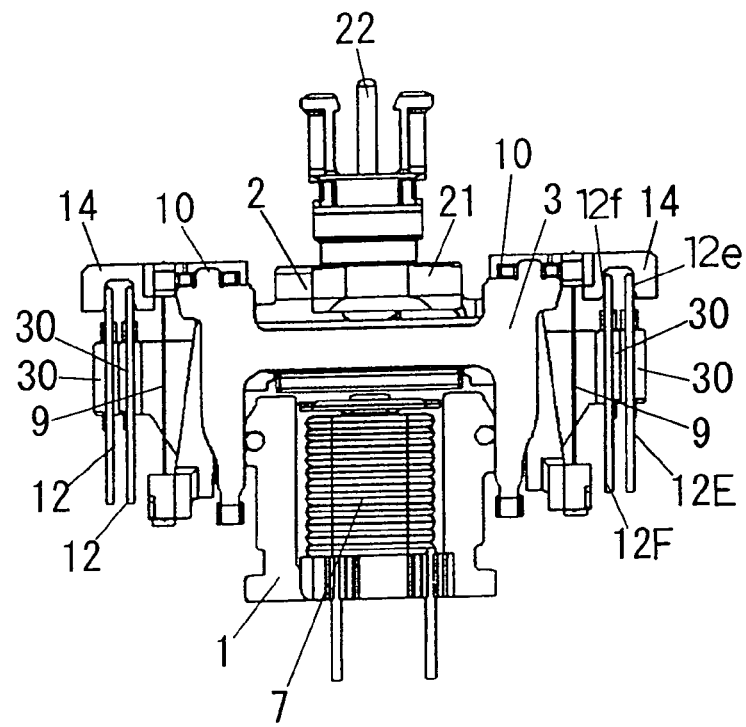
FIG. 16 is a side view showing an eleventh modification of the engaging structure of the stopper and the coupling member in the above-mentioned oscillation type linear actuator.
Figure 17:
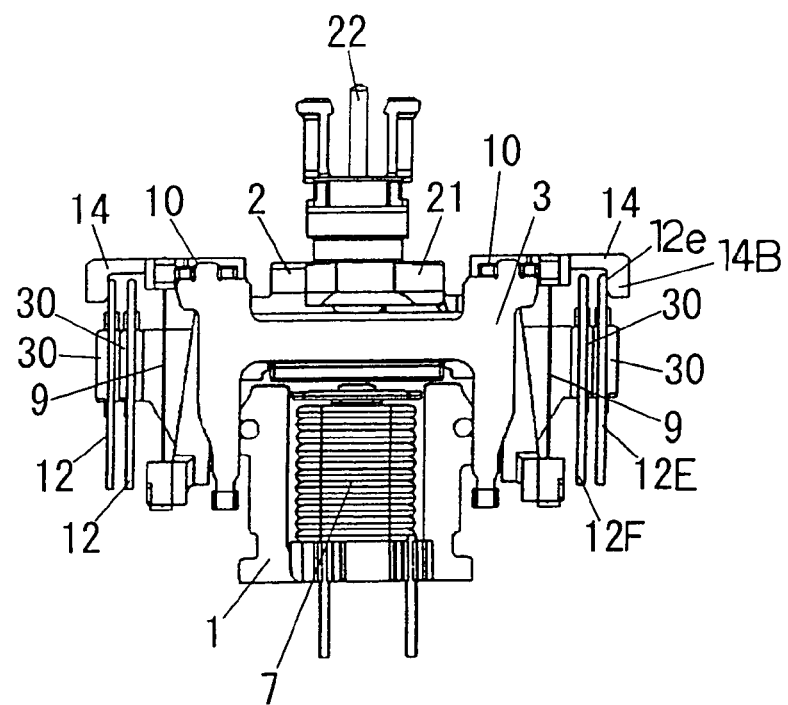
FIG. 17 is a side view showing a twelfth modification of the engaging structure of the stopper and the coupling member in the above-mentioned oscillation type linear actuator.
Figure 18:
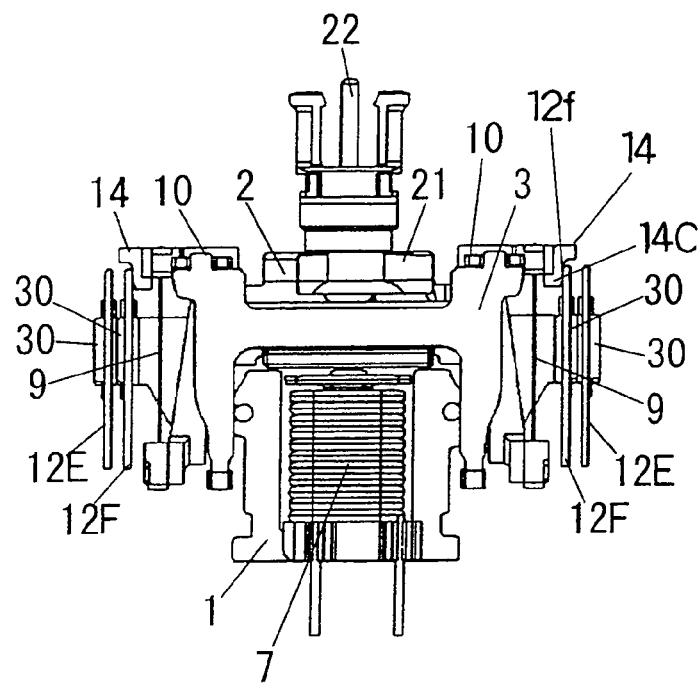
FIG. 18 is a side view showing a thirteenth modification of the engaging structure of the stopper and the coupling member in the above-mentioned oscillation type linear actuator.
Figure 19:
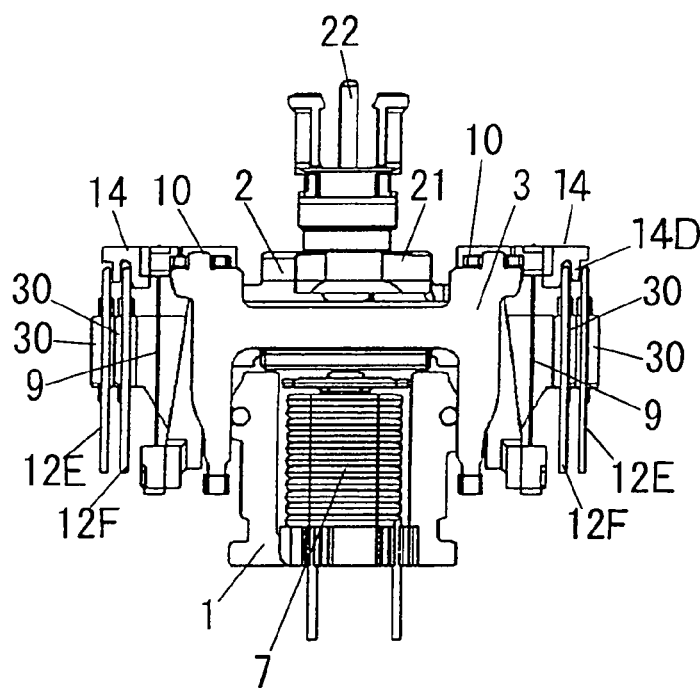
FIG. 19 is a side view showing a fourteenth modification of the engaging structure of the stopper and the coupling member in the above-mentioned oscillation type linear actuator.
Figure 20:
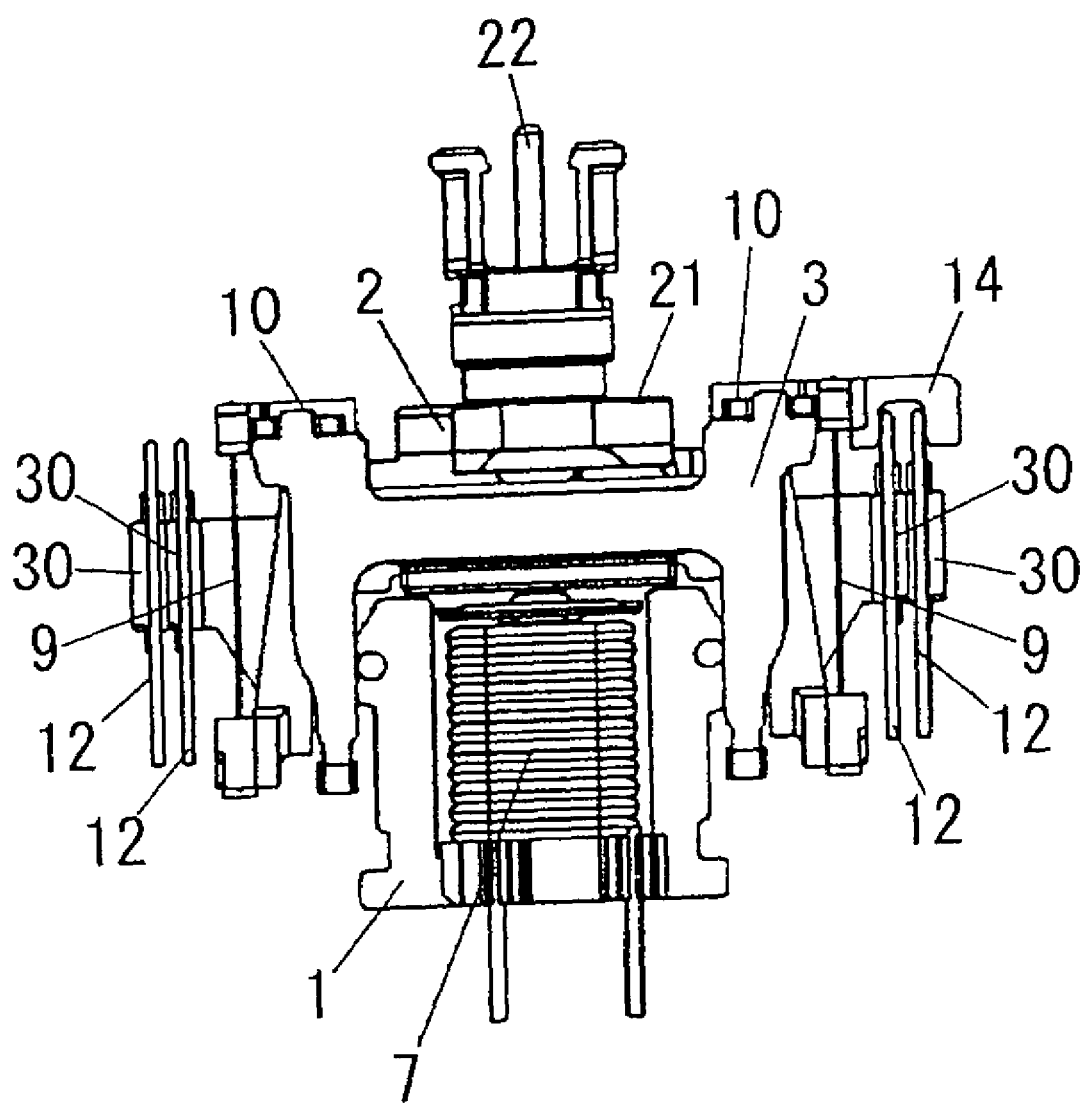
FIG. 20 is a side view showing a fifteenth modification of the engaging structure of the stopper and the coupling member in the above-mentioned oscillation type linear actuator.

In an eleventh modification shown in FIG. 16, it is configured that an outer face 12e of an outer coupling member 12E and an inner face 12f of an inner coupling member 12F respectively contact with both side faces of one groove 14A formed on one stopper 14. In a twelfth modification shown in FIG. 17, it is configured that a wall 14B is formed at an outer end of the stopper 14 instead of the groove, and only the outer face 12e of the outer coupling member 12E contacts with the wall 14B. In a thirteenth modification shown in FIG. 18, it is configured that a wall 14C is formed at an inner end of the stopper 14, and only the inner face 12f of the inner coupling member 12F contacts with the wall 14C. Alternatively, it is possible to configure that an inner face of the outer coupling member 12E and an outer face of the inner coupling member 12F respectively contact with both faces of a wall 14D, like a fourteenth modification shown in FIG. 19. It is possible to provide the stopper 14 only at one side, so that positioning restriction is carried out with respect to the non-displacing portions 12A of the coupling members 12 disposed at the same side, like a fifteenth modification shown in FIG. 20.

Figure 21:
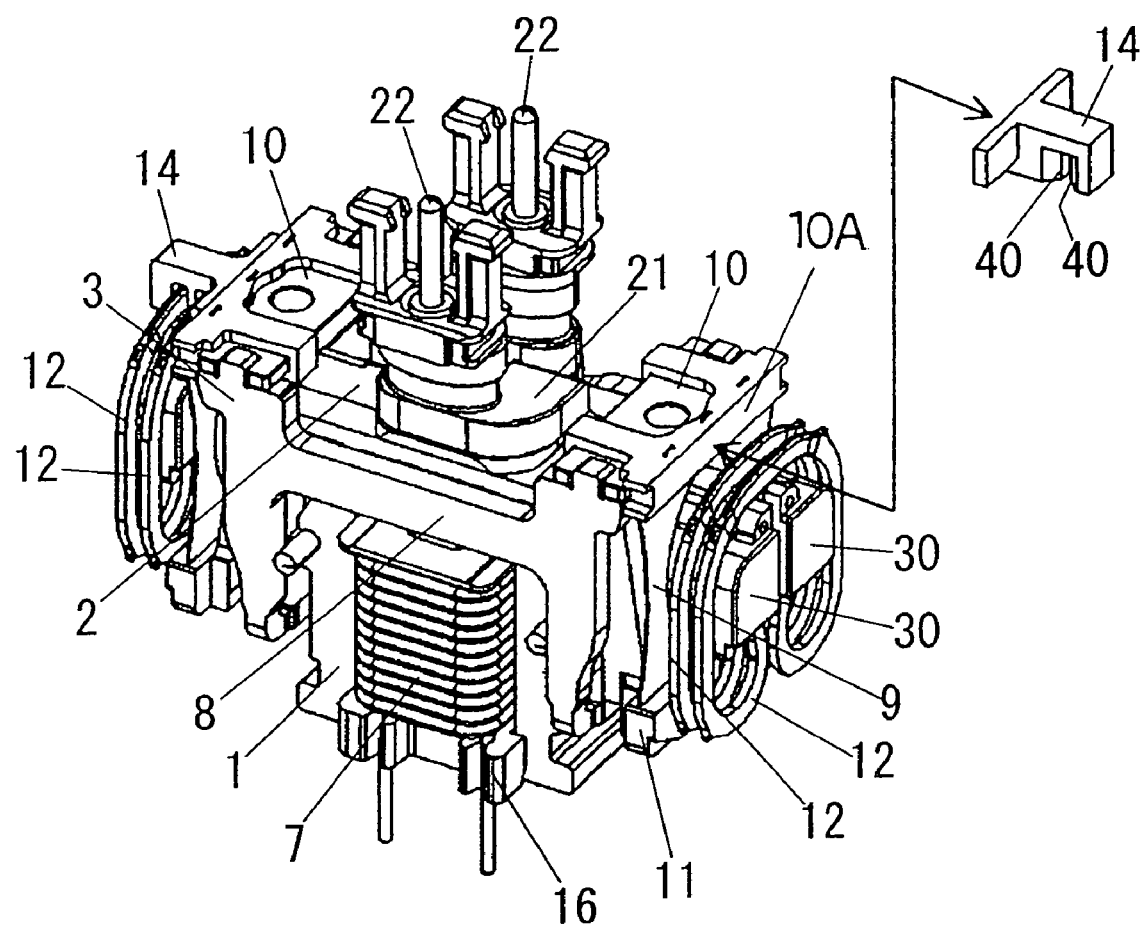
FIG. 21 is a perspective view showing an installing process of the engaging structure of the stopper and the coupling member in the above-mentioned oscillation type linear actuator.

As shown in FIG. 21, it is possible to configure that the stoppers 14 are adhered on end faces 10A of the bridge portions 10 of the suspenders 9, after the coupling portions 30 of the coupling members 121 are engaged with and fixed on the second protrusions 20 of the moving members 2A and 2B. In this case, fixing positions of the stoppers 14 can be adjusted corresponding to the positions of the non-displacing portions 12A of the coupling members 12, so that the positioning restriction of the non-displacing portions 12A of the coupling members 12 can surely be carried out.

Subsequently, deformations of the coupling member 12 are described. As shown in FIGS. 3 and 6, since the coupling member 12 is constituted as line symmetry with respect to the non-displacing portion 12A, the non-displacing portion 12A of the coupling member 12 is positioned substantially at the center of two moving members 2A and 2B, and the stopper 14 is provided substantially at the center of two moving members 2A and 2B. Thus, the stopper 14 is fitted within a width of the oscillation type linear actuator owing to the stopper 14 is fixed on the bridge portion 10 of the suspender 9.

Figure 22:
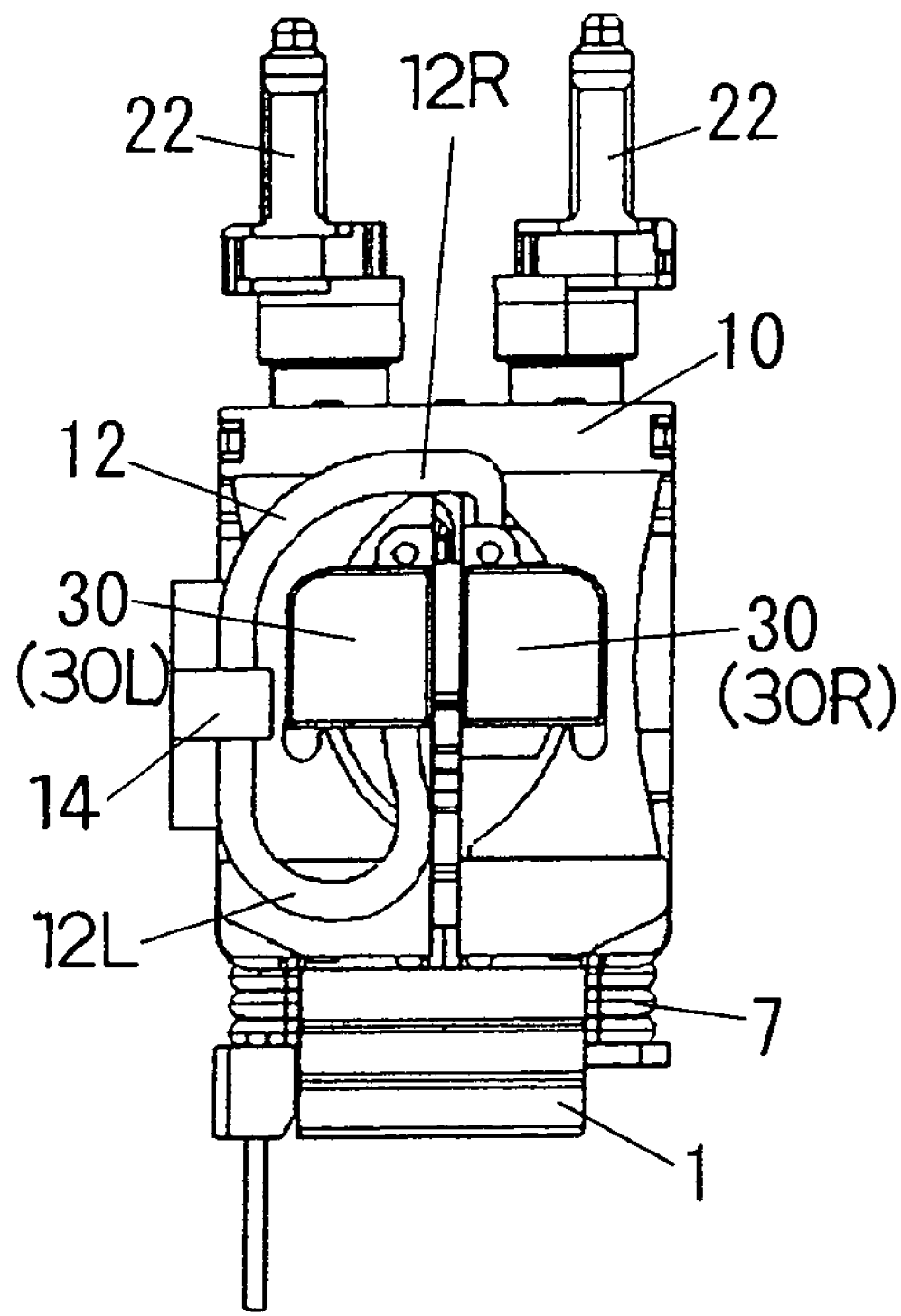
FIG. 22 is a front view showing a sixteenth modification with respect to the coupling member in the above-mentioned oscillation type linear actuator.

On the contrary, in a sixteenth modification shown in FIG. 22, the coupling member 12 is formed asymmetrical, so that the non-displacing portion 12A and the stopper 14 are positioned at a side of the oscillation type linear actuator. In order to make spring functions of the coupling portion 30L at left hand in the figure and the coupling portion 30R at right hand substantially the same, the shape of the coupling member 12 is designed in a manner so that a length from the non-displacing portion 12A to the coupling portion 30L at left hand is substantially equal to a length from the non-displacing portion 12A to the coupling portion 30R at right hand. In this case, even though the width of the oscillation type linear actuator becomes a little wider due to the stopper 14, a height at both ends of the oscillation type linear actuator where the coupling members 12 are provided can be made lower.

Figure 23:
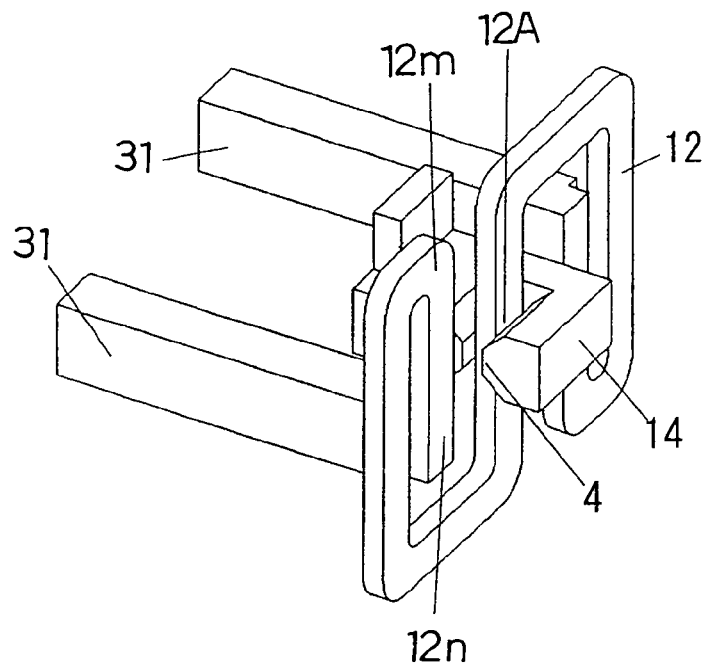
FIG. 23 is a perspective view showing a seventeenth modification with respect to the coupling member in the above-mentioned oscillation type linear actuator.
Figure 24:
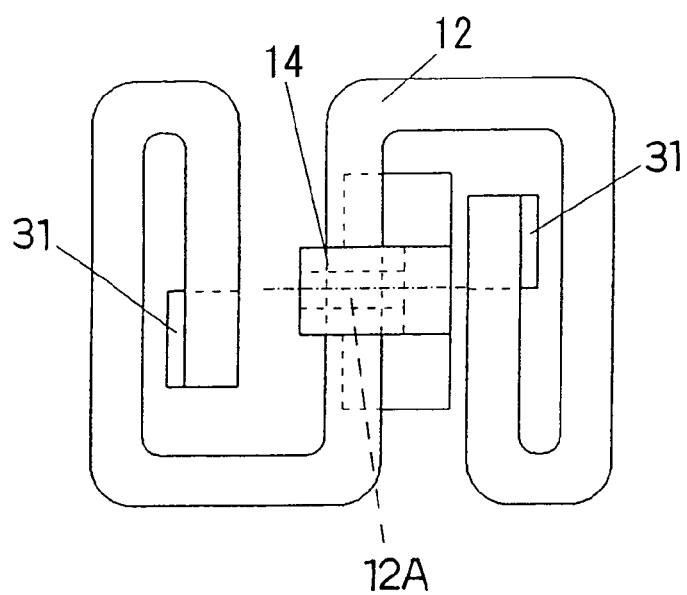
FIG. 24 is a front view showing the shape of the coupling member in the above-mentioned seventeenth modification.

In a seventeenth modification shown in FIGS. 23 and 24, the coupling member 12 is constituted point symmetrical with respect to the non-displacing portion 12A, so that the coupling member 12 is formed substantially S-shape. In this case, since the non-displacing portion 12A and the stopper 14 are positioned substantially at the center on a front face of the oscillation type linear actuator, it is possible to make the height and the width of the oscillation type linear actuator smaller. In addition, since the stopper 14 is provided at a position where the coupling portions 30L and 30R are disposed in FIGS. 3 and 5, it is necessary to change shapes and positions of coupling portions 31 which are coupled with the moving members 2A and 2B. In the seventeenth modification, arms 12n are extended inward from end portions 12m of a section having substantially S-shape, and the coupling portions 31 are formed by bending end portions of the extended arms 12n towards the moving members 2A and 2B.

Figure 25A:
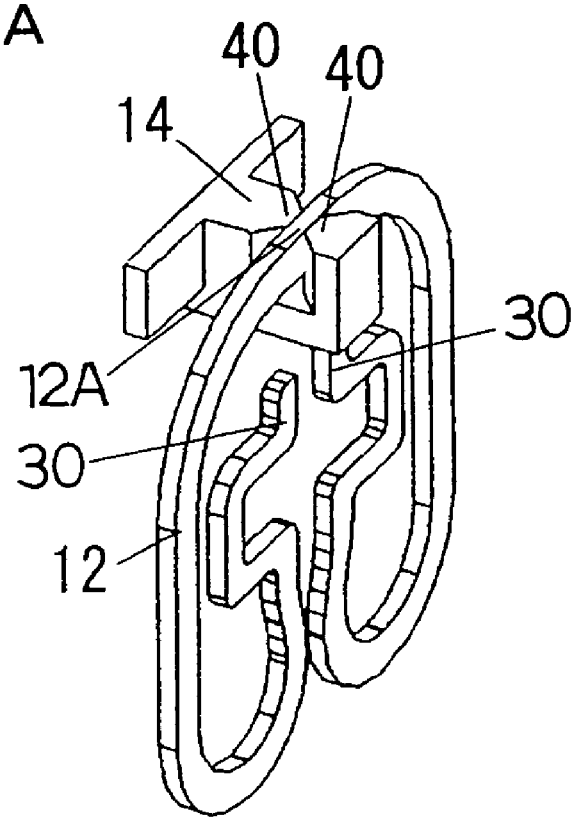
FIG. 25A is a perspective view showing an eighteenth modification of the engaging structure of the stopper and the coupling member in the above-mentioned oscillation type linear actuator.
Figure 25B:
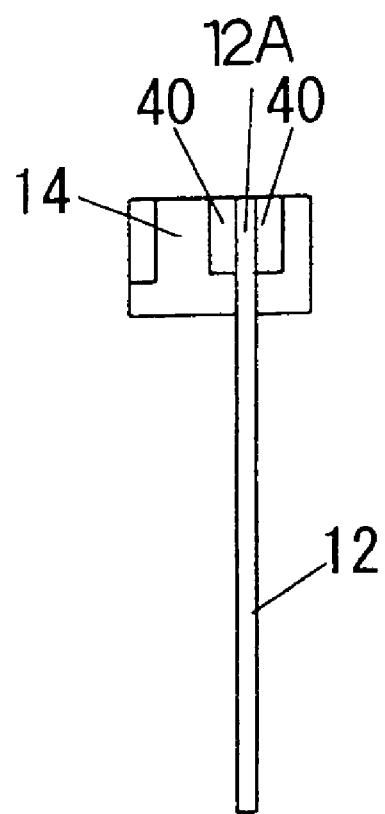
FIG. 25B is a side view showing the engaging structure of the stopper and the coupling member in the above-mentioned eighteenth modification.

In an eighteenth modification shown in FIGS. 25A and 25b, the stopper 14 is shaped to support the coupling member 12 at a lower end thereof (at a side of the stator 1) for restricting the motion of the coupling member 12 in a direction of absorption between the stator 1 and the moving members 2A and 2B (downward in Z-direction). In this case, since dimensions of the gaps 8 between the upper face of the stator 1 and the permanent magnets 4 on the moving members 2A and 2B can be maintained, it is possible to omit the suspenders 9.

Figure 26A:
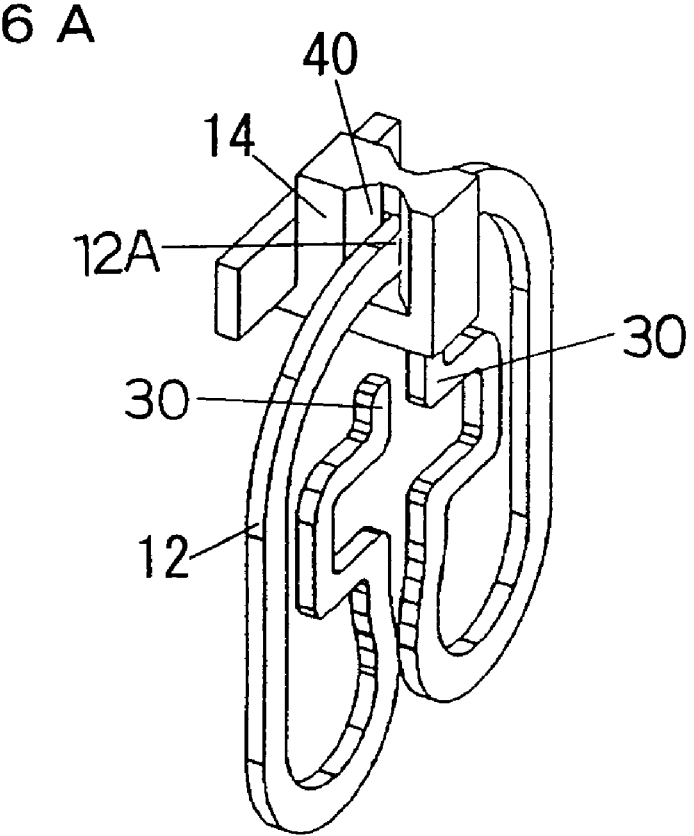
FIG. 26A is a perspective view showing a nineteenth modification of the engaging structure of the stopper and the coupling member in the above-mentioned oscillation type linear actuator.
Figure 26B:
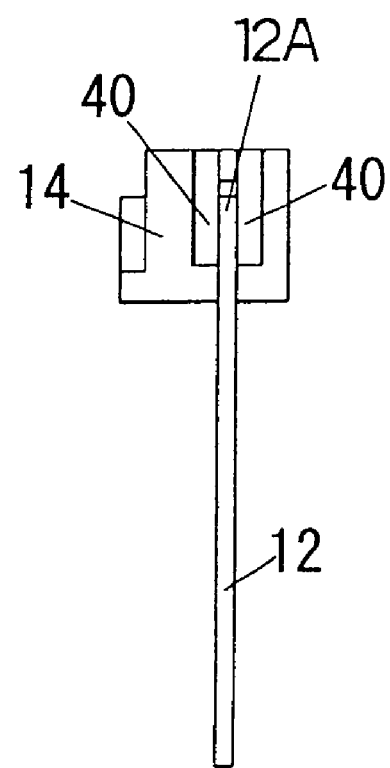
FIG. 26B is a side view showing the engaging structure of the stopper and the coupling member in the above-mentioned nineteenth modification.

Furthermore, in a nineteenth modification shown in FIGS. 26A and 26B, the stopper 14 is shaped to support the coupling member 12 at an upper end thereof too (at the opposite side of the stator 1) for restricting the motion of the coupling member 12 in a direction of objection between the stator 1 and the moving members 2A and 2B (upward in Z-direction), further to the above-mentioned constitution. In that case, resistance to the impact at the case of dropping, or the like can be increased in addition to the above-mentioned effects.

In the above-mentioned embodiments, the oscillation type linear actuator using two moving members, which is suitable for reciprocation type power shaver, is described. It is sufficient that a plurality of moving members is used, and it is not limited to two. Furthermore, since the use of the oscillation type linear actuator is not limited to the reciprocation type power shaver, it is possible to be used in other many apparatuses as a driving source thereof.

This application is based on Japanese patent application 2002-176466 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An oscillation type linear actuator comprising:
a plurality of moving members which are held in parallel with each other and reciprocally movable in a predetermined direction;
a stator for reciprocally moving the moving members respectively in the predetermined direction owing to electro-magnetic action between the moving members and it;
at least one coupling member coupling two moving members which are reciprocally moved in opposite phases with each other, and having a plate spring portion deformable corresponding to the reciprocal movement of the moving members; and
a stopper contacting with a non-displacing portion of the plate spring portion of the at least one coupling member which is not substantially displaced when the moving members are reciprocally moved in the opposite phase with each other, and for restricting a movement of the non-displaced portion in a direction of the reciprocal movement of the moving members.

2. The oscillation type linear actuator in accordance with claim 1, wherein one or a plurality of coupling members is provided at only one end or both ends of each moving member in a direction of reciprocal movement thereof.

3. The oscillation type linear actuator in accordance with claim 1, wherein the coupling member has two coupling portions respectively coupled with the moving members provided at both ends of the plate spring portion, and the non-displacing portion is positioned at a center portion of the plate spring portion.

4. The oscillation type linear actuator in accordance with claim 3, wherein the coupling member is formed in a manner so that the coupling portions and the plate spring portion are point symmetrical with respect to the non-displacing portion or line symmetrical with respect to a line passing the non-displacing portion.

5. The oscillation type linear actuator in accordance with claim 1, wherein the stopper contacts with one face or both faces of the coupling member in a direction of reciprocal movement of the moving members.

6. The oscillation type linear actuator in accordance with claim 1, wherein the stopper contacts with the coupling member at a point or along a line.

7. The oscillation type linear actuator in accordance with claim 1, wherein the stopper contacts with both faces of the coupling member at a point or along a line in a direction of reciprocal movement of the moving members.

8. The oscillation type linear actuator in accordance with claim 7, wherein protrusions or protruding portions for contacting at a point or along a line are formed on the stopper or the coupling member.

9. The oscillation type linear actuator in accordance with claim 1, wherein the stopper and the coupling member are rotatably borne by a rotation shaft provided on one of them and a bearing provide on the other.

10. The oscillation type linear actuator in accordance with claim 1, wherein a contacting portion or contacting portions of the stopper contacting with the coupling member is/are disposed at inside, outside or inside and outside of the coupling member in a direction of reciprocal movement of the moving members.

11. The oscillation type linear actuator in accordance with claim 1, wherein contacting portions of the stopper contacting with the coupling members are disposed between a plurality of coupling members disposed in parallel with a direction of reciprocal movement of the moving members.

12. The oscillation type linear actuator in accordance with claim 1, wherein the stopper further restricts displacement of the non-displacing portion of the coupling member in absorption direction between the stator and the moving members.

13. The oscillation type linear actuator in accordance with claim 12, wherein the stopper further restricts displacement of the non-displacing portion of the coupling member in objection direction between the stator and the moving members.

* * * * *